(12) United States Patent
Hufton et al.

(10) Patent No.: US 6,592,836 B2
(45) Date of Patent: Jul. 15, 2003

(54) PRODUCTION OF CARBON MONOXIDE

(76) Inventors: Jeffrey Raymond Hufton, 7931 Trails End, Fogelsville, PA (US) 18051; Shankar Nataraj, 1012 S. Hillview Dr., Allentown, PA (US) 18103

( * ) Notice: Subject to any disclaimer, the term of this patent is extended or adjusted under 35 U.S.C. 154(b) by 299 days.

(21) Appl. No.: 09/775,976

(22) Filed: Feb. 2, 2001

(65) Prior Publication Data

US 2002/0107294 A1 Aug. 8, 2002

(51) Int. Cl.$^7$ .................................................. C10K 1/20
(52) U.S. Cl. ...................................... 423/418.2; 252/373
(58) Field of Search ........................... 423/418.2; 95/95, 95/96; 252/373

(56) References Cited

U.S. PATENT DOCUMENTS 6,063,355 A * 5/2000 Fujimura et al. ........... 423/359
6,328,945 B1 * 12/2001 Hufton et al. ........... 423/418.2

FOREIGN PATENT DOCUMENTS

| EP | 0737648 | 10/1996 | ............ C01B/31/18 |
|---|---|---|---|
| EP | 0737647 | 9/1999 | ............ C01B/3/38 |
| EP | 0742172 | 9/1999 | ............ C01B/3/38 |

* cited by examiner

Primary Examiner—Stanley S. Silverman
Assistant Examiner—Edward M. Johnson
(74) Attorney, Agent, or Firm—Geoffrey L. Chase

(57) ABSTRACT

A process is provided which includes the steps of providing a CO-SER unit, feeding a feed gas of an equimolar mix of $CO_2$ and $H_2$ with a slight excess of $CO_2$ to the CO-SER unit to produce a CO-SER product gas of CO, a small amount of $CO_2$, and substantially no $H_2$ at high pressure, providing a TSA unit having a plurality of adsorber vessels, each adsorber vessel having an adsorbent capable of selectively adsorbing $CO_2$, the adsorber vessel being at high pressure and ambient temperature, and feeding the CO-SER product gas to one of the adsorber vessels in the TSA unit to selectively remove $CO_2$ gas to produce a TSA product gas that is of high purity and of high pressure. The feeding continues to the one adsorber vessel until a point prior to $CO_2$ breakthrough occurring. The process further includes regenerating any adsorber vessels having adsorbent that is substantially spent.

19 Claims, 2 Drawing Sheets

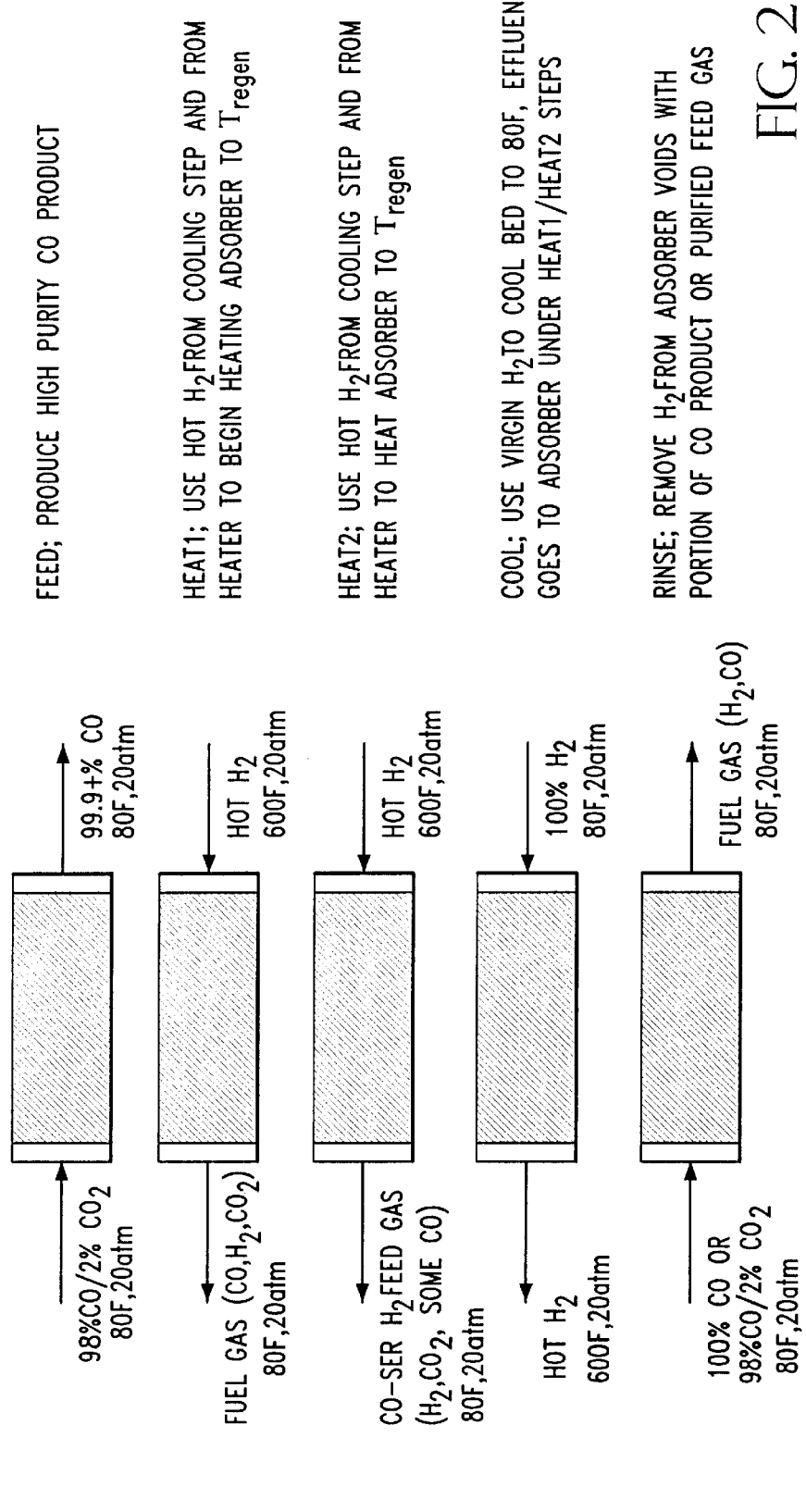

PRODUCTION OF CARBON MONOXIDE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention is directed to production of carbon monoxide (CO). In particular, the present invention is directed to production of high purity CO by integration of $CO_2$ Temperature Swing Adsorption (TSA) and CO Sorption Enhanced Reaction (CO-SER)units.

There is a need in the gas production industry for a more cost-effective process for the production of CO. Current technology is based on steam reforming or partial oxidation of hydrocarbon feed gas to obtain CO. Both technologies utilize high temperature reformers, and produce a relatively impure CO product stream which must be purified by cryogenic distillation or vacuum swing adsorption technology. Both of these approaches are capital and energy intensive.

It would be useful to the industry if an alternative CO production process could be developed which could produce high purity CO product without the need for high temperature reactors and expensive separation equipment.

Carvill et al. (EP 0 737 648 A2) describes a generic Sorption Enhanced Reaction (SER) process concept where the conversion of an equilibrium-controlled gas phase reaction is enhanced and relatively high purity product is produced by cyclically removing a by-product of the reaction by adsorption onto a solid adsorbent. Specifically, an SER process for producing CO from $CO_2$ and $H_2$ via the reverse water gas shift reaction (CO-SER) is described wherein a parallel assembly of reactors containing a physical mixture of water adsorbent and water gas shift catalyst is utilized. The reaction is carried out at a low temperature of 200–400 degrees Celsius. Adsorption of water from the reaction zone shifts the equilibrium-controlled reaction to essentially complete conversion of the feed components, and results in production of relatively high purity CO product gas. Although this CO purity is much higher than could be achieved with a catalyst-only reactor operated at the same conditions, which is, for example, 5.5% at 275 degrees Celsius (see example 2 of Carvill et al.), the SER product could still contain percentage levels of unreacted feed gases, $H_2$ or $CO_2$ (see, e.g., 98 and 97% CO illustrated in Example 1 of Carvill et al.).

The CO-SER process can be used to produce relatively high purity CO (e.g., 98%) from a feed gas consisting of 50% $CO_2$ and 50% $H_2$. The CO is produced by the reverse water gas shift reaction, $CO_2+H_2=CO+H_2O$. The adsorption of water from the reaction zone drives the local conversion of $CO_2$ and $H_2$ towards completion. The purity of the product gas is typically determined by breakthrough of one of the components of the feed. In an ideal system with no $CO_2/H_2$ adsorption on the adsorbent or catalyst, $CO_2$ will break through with the product CO if slightly $CO_2$-rich feed gas is used, and $H_2$ will break through with the product CO if slightly $H_2$-rich feed gas is used. Attainment of higher purity product is possible in principle by terminating the sorption-reaction step before significant breakthrough of $CO_2$ or $H_2$, but this decreases the reactor productivity.

Integration of the CO-SER concept with conventional reforming process technology has been described by Hufton et al. in European Applications EP 0737 647 B1 and EP 0742 172 B1. In both cases, the CO-SER process was added to process a feed gas produced from conventional CO process equipment. In the first case, a CO-SER unit was used to convert $CO_2$ and $H_2$ in effluent gas from a steam methane reformer (SMR) into additional CO. The effluent from the CO-SER unit was then passed to a conventional CO separation unit for product recovery. In the second case, a CO-SER unit was used to produce CO from $CO_2$ and $H_2$ present in the waste gas from a CO-VSA/$H_2$-PSA system. These integrated processes were developed to improve the overall yield of CO from the $CH_4$ fed to the SMR system, and not to improve the purity of the CO-SER product.

BRIEF SUMMARY OF THE INVENTION

The present invention incorporates the operation of an SER process unit for CO production with a $CO_2$ Temperature Swing Adsorption (TSA) unit used for final CO cleanup.

The present invention describes a modification to the operation procedure and flowsheet of the Carvill et al. process wherein a high purity CO product (99.9+%) can be produced by integration of a unique CO purification system with the rest of the CO-SER process. The CO-SER is operated to produce CO (with <5% $CO_2$ as the major impurity) from a feedstock of $H_2$ and $CO_2$. This gas is fed to the $CO_2$ TSA unit to produce high purity (99.9+%) CO.

The processes are integrated through the TSA regeneration step. Regenerant $H_2$ used to heat and cool and purge the TSA beds is used as the feed gas to the CO-SER unit. This unique approach is feasible because (1) the TSA unit can be purged at high pressure (the CO-SER reaction pressure), (2) the TSA process steps are designed to reduce the level of CO in the $H_2$ effluent gas, and (3) $CO_2$ can be tolerated in the $H_2$ feed to the CO-SER unit.

A process for producing high purity carbon monoxide product gas is provided which includes the steps of providing a CO-SER unit, feeding a feed gas of an equimolar mix of $CO_2$ and $H_2$ with a slight excess of $CO_2$ to the CO-SER unit to produce a CO-SER product gas of CO, a small amount of $CO_2$, and substantially no $H_2$ at high pressure, providing a TSA unit having a plurality of adsorber vessels, each adsorber vessel having an adsorbent capable of selectively adsorbing $CO_2$, the adsorber vessel being at high pressure and ambient temperature, and feeding the CO-SER product gas to one of the adsorber vessels in the TSA unit to selectively remove $CO_2$ gas to produce a TSA product gas that is of high purity and of high pressure. The feeding continues to the one adsorber vessel until a point prior to $CO_2$ breakthrough occurring, wherein the adsorbent is substantially spent. The other adsorber vessels are then sequentially fed. The process further includes regenerating any adsorber vessels having adsorbent that is substantially spent and providing $H_2$ for the feed gas in a regeneration process which includes heating the spent adsorbent by passing $H_2$ at high temperature and high pressure to produce a TSA regeneration effluent gas of $H_2$, $CO_2$ and low levels of CO that is of sufficient purity to be used as $H_2$ in the feed gas in a CO-SER process where the TSA effluent gas is provided at high pressure and ambient temperature, and combining the TSA effluent gas with a feed of $CO_2$ to obtain the feed gas of substantially equimolar mix of $CO_2$ and $H_2$ with a slight excess of $CO_2$ and small amount of CO.

Alternatively, the regenerating steps may also provide fuel for a fired heater in the CO-SER. The regenerating steps include heating the adsorbent in at least one of the adsorber vessels having substantially spent adsorbent therein by passing $H_2$ at high temperature and high pressure through the adsorber vessel to eliminate a substantial portion of CO from the adsorber vessel (in the form of void gas and some coadsorbed CO) and producing a first TSA regeneration effluent gas containing $H_2$, a small amount of $CO_2$ and smaller amount of CO at high pressure and ambient temperature; providing the first TSA regeneration effluent gas for fuel for the CO-SER unit; continuing to heat the spent adsorbent by passing $H_2$ at high temperature and high pressure to produce a second, more $H_2$-rich TSA regeneration effluent gas of $H_2$, $CO_2$ and low levels of CO that is of sufficient purity to be used as $H_2$ in the feed gas in a CO-SER process, where the second TSA effluent gas is provided at high pressure and ambient temperature; and combining the second TSA effluent gas with a feed of $CO_2$ to obtain the feed gas of substantially equimolar mix of $CO_2$ and $H_2$ with a slight excess of $CO_2$ and small amount of CO. The adsorbent in the at least one adsorber vessel is then cooled by passing virgin, substantially 100% pure $H_2$ at high pressure and ambient temperature through the adsorber and producing an effluent of $H_2$ gas at a temperature between high and low temperature and high pressure. If neccessary, the temperature of the effluent of $H_2$ gas obtained in the step of cooling said adsorber to high temperature is adjusted to high temperature. The effluent of $H_2$ gas is provided as the $H_2$ in the step of heating the adsorbent in the adsorber vessels having substantially spent adsorbent therein to produce a first TSA regeneration effluent gas and in the step of continuing to heat said spent adsorbent by passing $H_2$ at high temperature and high pressure to produce the second, more pure TSA regeneration effluent gas. A plurality of the steps of feeding the CO-SER product gas to one of the plurality of adsorber vessels and the regenerating steps of heating the adsorbent in at least one of the adsorber vessels, continuing to heat the spent adsorbent, and cooling the adsorbent in the adsorber vessel may occur simultaneously where each step occurs in at least one of the plurality of adsorber vessels.

BRIEF DESCRIPTION OF SEVERAL VIEWS OF THE DRAWINGS

FIG. 2 is a schematic diagram of a regeneration process for use with the three bed TSA unit of FIG. 1.

FIG. 3 is a cycle diagram depicting process steps as a function of time in accordance with the three bed TSA of FIG. 1.

DETAILED DESCRIPTION OF THE INVENTION

Figure 1:
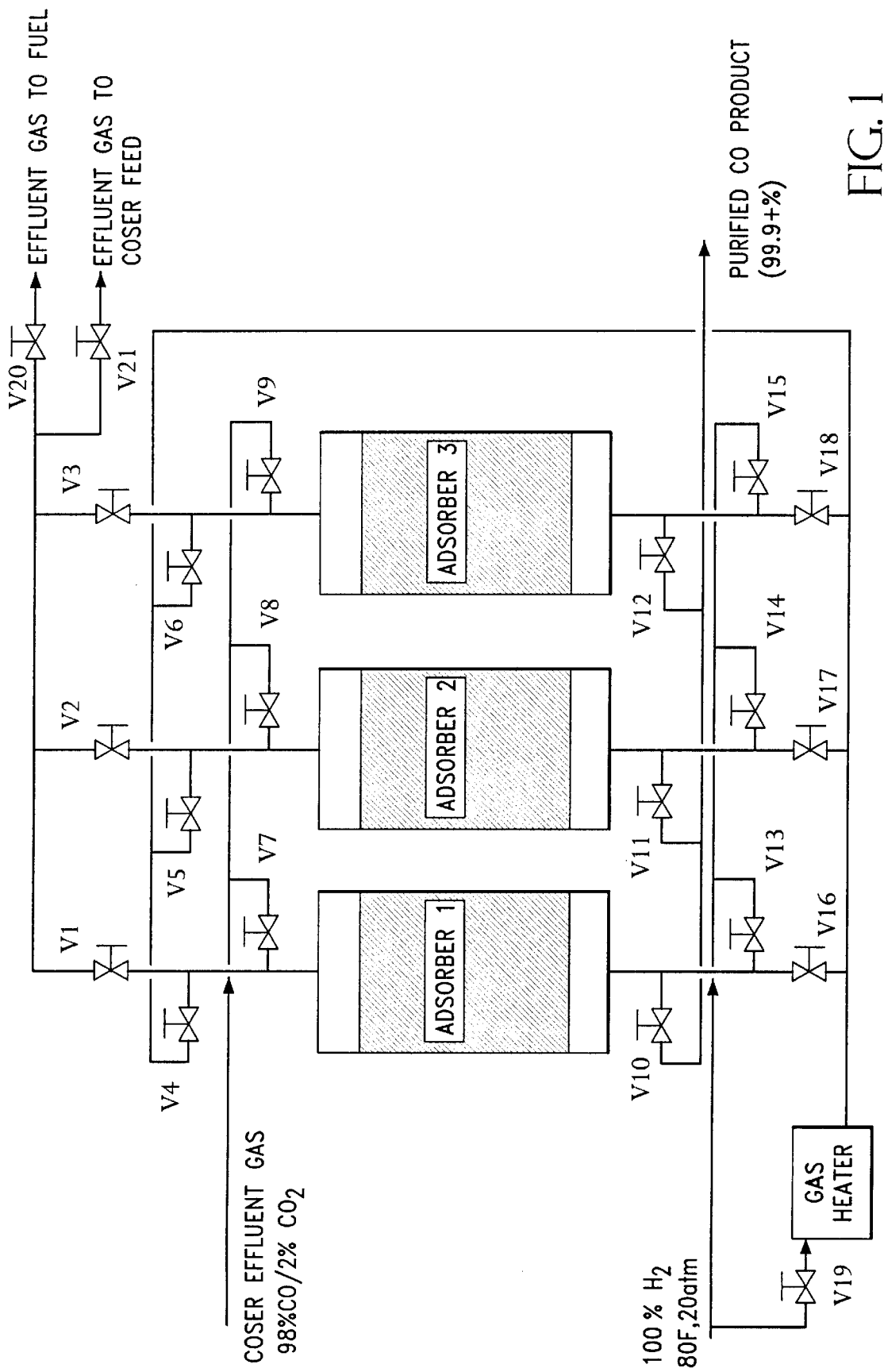
FIG. 1 is a schematic diagram of an example of a three bed TSA unit for use in accordance with the present invention.

This present invention is a process and operational procedure to produce high purity CO (>99.9%) with an integrated combination of CO-SER unit and $CO_2$ TSA unit.

It is much easier to remove low levels of $CO_2$ from CO compared to low levels of $H_2$ from CO via adsorption. Thus, operating a CO-SER process unit in such a way that $CO_2$-contaminated CO is produced is preferred. This can be achieved by feeding a slightly $CO_2$-rich feed gas relative to the 50/50 stoichiometric $CO_2/H_2$ mixture. In the present invention, a slightly $CO_2$-rich feed gas (e.g., 50.5% $CO_2$/49.5% $H_2$) is fed to the CO-SER reactor, and a product gas containing CO and a small amount of $CO_2$ is produced (e.g., 98% CO, 2% $CO_2$). The product is produced at the CO-SER reactor pressure (4–20 atm). There is essentially no $H_2$ because it has reacted completely to extinction. The product gas is then cooled to ambient temperature in a heat exchanger and passed to a $CO_2$ TSA unit. The TSA unit consists of two or more vessels (referred to as adsorbers) packed with an adsorbent with suitable adsorption capacity and selectivity for $CO_2$ Many adsorbents are possible, e.g., 5A and 13X zeolite, alumina, etc. $CO_2$ is removed from the gas during the adsorption step, producing a high purity (99.9+%) CO product at high pressure (4–20 atm). Before $CO_2$ breakthrough occurs, the feed gas is diverted to a second TSA adsorber and the first TSA adsorber is regenerated by heating to high temperature (e.g., 600 degrees Fahrenheit). A schematic of a three bed TSA unit in accordance with the present invention is illustrated in FIG. 1. Various valves are depicted as V1 through V21.

Integration of the CO-SER and $CO_2$ TSA units is accomplished through the TSA regeneration step. In previous descriptions of the CO-SER technology, the $H_2$ used to feed the CO-SER reactors is fed to the SER reactors at high pressure (e.g. from a pipeline or internal source). Since the $H_2$ stream is combined with the other feedstock, $CO_2$, the presence of lower levels of $CO_2$ (e.g., <50%) in the $H_2$ feed gas is not an issue. In the current invention, $H_2$ feed gas to the SER reactors is taken from the effluent of the regenerating TSA beds. Instead of passing feed $H_2$ directly to the SER reactors, a portion of the $H_2$ feed gas is first heated (via a combination of a gas heater and one of the hot TSA adsorber vessels) and passed through the spent TSA adsorber undergoing regeneration. By conducting this step at high pressure, the cooled effluent gas exiting the adsorber (containing $H_2$ plus a few percent of $CO_2$ and low levels of CO) can then be sent to the CO-SER unit as feed gas.

This high pressure regeneration step with hydrogen is particularly novel in its ability to take advantage of the synergies between the CO-SER and $CO_2$ TSA processes.

The most common and conventional approach for regeneration of a spent adsorber similar to that described in this process is to heat a portion of the high purity product CO and pass it countercurrently through the spent adsorber. This approach decreases the productivity of the TSA process, since the CO used to regenerate is lost (typically to fuel). In addition, heating CO to temperatures greater than 600 degrees Fahrenheit is difficult due to the possibility of coking. One could consider using a hot extraneous purge fluid, e.g., $N_2$ or natural gas, to heat up the adsorber, followed by a CO rinse step to clean the voids of purge gas before the next feed step. For $N_2$, this requires excessive capital and/or operating cost for the extraneous fluid (LIN or $N_2$ PSA). Although the effluent gas in the case of natural gas could be used as fuel for the CO-SER unit, significant capital would be required to remove sulfur compounds from the natural gas. If the natural gas has percent levels of $CO_2$, it cannot be used for cool-down. Heavy compounds always present in natural gas ($C_2$–$C_5$) could also adsorb on the $CO_2$ TSA adsorbent resulting in lower adsorbent capacity with time and impurities in the CO product gas. Finally, there are TSA systems which include internal heaters within the adsorber vessels for heating up the adsorbent. A relatively small amount of product CO would then be used to purge the adsorber at regeneration temperature. This would substantially reduce the amount of CO needed for regeneration, but necessarily requires relatively high-cost adsorber vessels and operating cost (electricity/steam for heaters).

A more detailed description of the invention can be seen in the schematic illustrated in FIG. 2 and the cycle diagram of FIG. 3. The schematic depicts one of the adsorber vessels during the cycle. With three vessels, feed gas passes through one of the vessels at all times while the other two are regenerating (heating/cooling). The temperatures and pressures listed in the diagram and described in the text are illustrative only, and pressure drop has been neglected in the diagram. The steps are described below.

Feed Step: The adsorber vessel has been previously purged with product CO and is at 20 atm, 80 degrees Fahrenheit. Feed gas containing CO and <5% $CO_2$ is fed to the adsorber where $CO_2$ is selectively adsorbed, yielding high purity CO product gas at 20 atm and 80 degrees Fahrenheit. The feed step is terminated before significant levels of $CO_2$ have broken through the adsorber.

Heat1 step: Regeneration of the spent adsorber begins as hot $H_2$ is passed at 600 degrees Fahrenheit, 20 atm to the product end of the adsorber (countercurrent flow). The hot $H_2$ comes from either the effluent of an adsorber undergoing the cooling step or the effluent from a gas heater, or a combination of both. The purpose of this step is to eliminate most of the CO in the adsorber (primarily contained in the gas voids, but also coadsorbed on the adsorbent). The effluent gas from this step, containing mostly $H_2$, CO and $CO_2$ at 20 atm, 80 degrees Fahrenheit, is used as fuel in a fired process heater. This step is carried out until the CO level in the effluent gas is low enough to be used as CO-SER feed gas (e.g., <1%).

Heat2 step: The hot $H_2$ feed flow is continued in this step, but the effluent gas, which now consists of $H_2$, $CO_2$, and low levels of CO at 20 atm, 80 degrees Fahrenheit, is combined with the feedstock $CO_2$ to obtain a feed gas of essentially equimolar mix of $CO_2$ and $H_2$ with a slight excess of $CO_2$ and low level of CO and passed to the CO-SER reactors. This step continues for the rest of the heating cycle.

Cooling step: The hot adsorber is cooled by passing virgin 100% $H_2$ at 20 atm, 80 degrees Fahrenheit through it in a countercurrent direction. The effluent gas at 600 degrees Fahrenheit, 20 atm is used as the feed gas to the Heat1, Heat2 steps above.

Rinse step (optional): The $H_2$ in the voids of the adsorber are removed by purging either cocurrently with feed, or countercurrently with a portion of the CO product (80 degrees Fahrenheit, 20 atm) generated in the Feed step. The effluent gas, consisting of $H_2$ and 5–10% CO at 80 degrees Fahrenheit, 20 atm, is used as fuel in the SER fired heater. Alternately, the rinse can be omitted at the cost of a slight impurity spike in the CO product.

The above sequence of steps can be modified as follows:

A countercurrent depressurization step can be inserted between the feed step and the Heat1 step. The adsorber vessel would be let down to a pressure consistent with the fuel supply (e.g., 5–10 psig) and then subjected to the Heat1 step at that pressure. This step can increase the amount of CO (and $CO_2$) removed from the adsorber for a given molar amount of hot $H_2$ in Heat1, or could be used to reduce the amount of hot $H_2$ sent to fuel in Heat1 step while removing the same amount of CO (and $CO_2$) as the high-pressure base case. The adsorber would also require a pressurization step between the Heat1 and Heat2 steps in order to permit use of Heat2 effluent as CO-SER feed (pressurized).

The amount of hot $H_2$ fed to the adsorber in the Heat1, Heat2 steps can be specified to increase the temperature of the entire adsorption unit (e.g., including adsorbent, support plates, vessel walls, insulation) to 600 degrees Fahrenheit. One can also carry out the regeneration by pulsing the temperature of the system. In this case, a smaller amount of hot $H_2$ is countercurrently fed to the adsorber which heats up, for example, half of the adsorber bed (product side). Cool $H_2$ is then fed countercurrently to the adsorber which both cools the product-end of the bed and pushes the high-temperature zone in the bed towards the feed end. Once this zone passes out the vessel, the bed has been regenerated and is at cool conditions. This approach could reduce the number of beds to two rather than three. The hot 100% $H_2$ used as feed during the regeneration steps would all come from the gas heater in this case. A portion of the effluent gas from the adsorber would be sent to the CO-SER reactors as feed.

The gas heater illustrated in FIG. 1 could be electrical or fuel fired. The most convenient embodiment, though, would be a gas heat exchanger which heats incoming $H_2$ against hot (e.g., 650 degrees Fahrenheit) heat transfer fluid. This is particularly attractive when a CO-SER unit is integrated with the $CO_2$ TSA since heat transfer fluid is available from the CO-SER process. Once again, this approach would capitalize on the synergies of the two unit operations.

Table 1 depicts a cycle diagram for a typical three bed TSA unit which shows the operation of each particular TSA adsorber during the process. For example, at time zero, while adsorber 1 is being used to accept CO-SER product gas to produce high purity CO and for removal of $CO_2$ gas, the second adsorber, Adsorber 2 is being used in the cooling step of the regeneration process, while Adsorber 3 is being used in the Heat1 step of the regeneration process.

Purging of a TSA at high pressure is counterintuitive. Conventionally, TSAs, PSAs and even empty vessels are purged at sub-process pressures to enable efficient regeneration and volume displacement. However, regeneration of TSAs is driven by high temperature rather than low adsorbate partial pressure—there is no reason why high regeneration pressures could not be used. Indeed, many design procedures for TSAs specify the purge gas amount according to the calorimetric requirements of the bed so there is enough gas flow to heat and cool the bed; by this time the bed is clean. To this end, a high pressure purge gas may be cheaper to heat and cool than a low pressure purge gas due to higher heat transfer coefficients at elevated pressures.

It is noted that throughout this specification, high temperature is preferably defined as being in the range of about 300 to 800 degrees Fahrenheit and preferably about 600 degrees Fahrenheit and low temperature is preferably defined as being in the range of about ambient to 150 degrees Fahrenheit.

Although illustrated and described herein with reference to specific embodiments, the present invention nevertheless is not intended to be limited to the details shown. Rather, various modifications may be made in the details within the scope and range of equivalents of the claims without departing from the spirit of the invention.

What is claimed is:

1. A process for producing high purity carbon monoxide product gas which comprises the steps of:
    (a) providing a CO-SER unit;
    (b) feeding a feed gas of a substantially equimolar mix of $CO_2$ and $H_2$ with a slight excess of $CO_2$ to the CO-SER unit to produce a CO-SER product gas comprising CO, a small amount of $CO_2$, and substantially no $H_2$ at high pressure;
    (c) providing a TSA unit having a plurality of adsorber vessels, each adsorber vessel having an adsorbent therein capable of selectively adsorbing $CO_2$, said adsorber vessel being at high pressure and low temperature;

(d) feeding the CO-SER product gas to one of said plurality of adsorber vessels in the TSA unit to selectively remove $CO_2$ gas to produce a TSA product gas that is of high CO purity and of high pressure, said feeding continuing to said one adsorber vessel until a point prior to $CO_2$ breakthrough occurring, wherein said adsorbent therein is substantially spent and then going on to sequentially feed others of said plurality of adsorber vessels; and (e) regenerating any adsorber vessels having adsorbent that is substantially spent and simultaneously providing $H_2$ for said feed gas of substantially equimolar mix of $CO_2$ and $H_2$ in a regeneration process comprising:

(i) heating said spent adsorbent obtained in the step of feeding the CO-SER product gas to one of said plurality of adsorber vessels in the TSA unit by passing $H_2$ at high temperature and high pressure to produce a TSA regeneration effluent gas of $H_2$, $CO_2$ and low levels of CO that is of sufficient purity to be used as $H_2$ in the feed gas in a CO-SER process, said TSA effluent gas provided at high pressure; and (ii) combining said TSA effluent gas with a feed of $CO_2$ to obtain the feed gas of substantially equimolar mix of $CO_2$ and $H_2$ with a slight excess of $CO_2$.

2. A process for producing high purity carbon monoxide product gas which comprises the steps of:

(a) providing a CO-SER unit;

(b) feeding a feed gas of a substantially equimolar mix of $CO_2$ and $H_2$ with a slight excess of $CO_2$ to the CO-SER unit to produce a CO-SER product gas comprising CO, a small amount of $CO_2$, and substantially no $H_2$ at high pressure;

(c) providing a TSA unit having a plurality of adsorber vessels, each adsorber vessel having an adsorbent therein capable of selectively adsorbing $CO_2$, said adsorber vessel being at high pressure and low temperature;

(d) feeding the CO-SER product gas to one of said plurality of adsorber vessels in the TSA unit to selectively remove $CO_2$ gas to produce a TSA product gas that is of high CO purity and of high pressure, said feeding continuing to said one adsorber vessel until a point prior to $CO_2$ breakthrough occurring, wherein said adsorbent therein is substantially spent and then going on to sequentially feed others of said plurality of adsorber vessels; and (e) regenerating any adsorber vessels having adsorbent that is substantially spent, providing fuel for a fired heater in the CO-SER, and providing $H_2$ for said feed gas of substantially equimolar mix of $CO_2$ and $H_2$, in a regeneration process comprising the steps of:

(i) heating said adsorbent in at least one of said adsorber vessels having substantially spent adsorbent therein by passing $H_2$ at a high temperature and high pressure through the adsorber vessel to eliminate a substantial portion of CO in the adsorber vessel and producing a first TSA regeneration effluent gas of $H_2$, a small amount of $CO_2$ and smaller amount of CO at high pressure;

(ii) providing said first TSA regeneration effluent gas for fuel for the CO-SER unit;

(iii) continuing to heat said spent adsorbent by passing $H_2$ at high temperature and high pressure to produce a second, more pure TSA regeneration effluent gas of $H_2$, $CO_2$ and low levels of CO that is of sufficient purity to be used as $H_2$ in the feed gas in a CO-SER process, said second TSA effluent gas provided at high pressure;

(iv) combining the second TSA effluent gas with a feed of $CO_2$ to obtain the feed gas of substantially equimolar mix of $CO_2$ and $H_2$ with a slight excess of $CO_2$;

(v) cooling said at least one adsorber vessel subsequent to said step of continuing to heat said spent adsorbent by passing virgin, substantially 100% pure $H_2$ at high pressure and ambient temperature through the adsorber and producing an effluent of $H_2$ gas at a temperature between high and low temperatures and high pressure;

(vi) adjusting, if neccessary, the temperature of the effluent of $H_2$ gas obtained in the step of cooling said adsorber to high temperature; and (vii) providing the effluent of $H_2$ gas produced in the step of cooling said at least one adsorber vessel as the $H_2$ in the step of heating the adsorbent in said adsorber vessels having substantially spent adsorbent therein and producing the first TSA effluent gas and in the step of continuing to heat said spent adsorbent by passing $H_2$ at high temperature and high pressure to produce the second, more pure TSA regeneration effluent gas;

wherein a plurality of said steps of feeding the CO-SER product gas to one of said plurality of adsorber vessels and said regenerating steps of heating said adsorbent in at least one of said adsorber vessels, continuing to heat said spent adsorbent and cooling the adsorbent in the adsorber vessel may occur simultaneously, each step occurring in at least one of said plurality of adsorber vessels.

3. The process for producing high purity carbon monoxide product gas of claim 2 wherein the high purity carbon monoxide product gas of at least 99.9% purity.

4. The process for producing high purity carbon monoxide product gas of claim 2, wherein high pressure means approximately 4 to 20 atmospheres.

5. The process for producing high purity carbon monoxide product gas of claim 2, wherein high temperature is defined as being in the range of about 300 to 800 degrees Fahrenheit and preferably about 600 degrees Fahrenheit and low temperature is defined as being in the range of about ambient to 150 degrees Fahrenheit.

6. The process for producing high purity carbon monoxide product gas of claim 2, wherein the step of providing the TSA unit having a plurality of adsorber vessels includes providing the TSA unit having three adsorber vessels, wherein the step of regenerating any adsorber vessels includes regenerating two of said three adsorber vessels, wherein one of said adsorber vessels being regenerated is used for the heating steps in the regenerating steps and one of said adsorber vessels being regenerated is used for the cooling steps in the regenerating steps.

7. The process for producing high purity carbon monoxide product gas of claim 2, wherein the steps of regenerating any adsorber vessels includes countercurrently or cocurrently rinsing voids of the adsorber to remove $H_2$ using the TSA product gas to produce an effluent gas consisting of $H_2$ and approximately 5 to 10% CO at high pressure and providing said effluent gas for fuel for the CO-SER unit, wherein said rinsing may occur simultaneously with said other steps in the process for producing high purity carbon monoxide product gas.

8. The process for producing high purity carbon monoxide product gas of claim 2, wherein the steps of regenerating any adsorber vessels includes cocurrently rinsing voids of the adsorber to remove $H_2$ using the CO-SER product gas to produce an effluent gas consisting of $H_2$ and approximately 5 to 10% CO at high pressure and providing said effluent gas for fuel for the CO-SER unit.

9. The process for producing high purity carbon monoxide product gas of claim 2, wherein the step of heating said adsorbent in said adsorber vessels having substantially spent adsorbent therein by passing $H_2$ at high temperature and high pressure through the adsorber vessel includes specifying the required amount of $H_2$ at high temperature as the amount needed to increase the temperature of the an entire adsorption unit including adsorbent, support plates, vessel walls and insulation, to the temperature of the $H_2$ at high temperature.

10. The process for producing high purity carbon monoxide product gas of claim 2, wherein the step of heating said adsorbent in said adsorber vessels having substantially spent adsorbent therein by passing $H_2$ at high temperature and high pressure through the adsorber vessel includes specifying the required amount of $H_2$ at high temperature as less than the amount needed to increase the temperature of an entire adsorption unit, including adsorbent, support plates, vessel walls and insulation and feeding the $H_2$ countercurrent to the direction of the CO-SER product feed, and wherein said step of cooling said adsorber is performed in the same counter-current direction.

11. A process for producing high purity carbon monoxide product gas which comprises the steps of:
   (a) providing a CO-SER unit;
   (b) feeding a feed gas of a substantially equimolar mix of $CO_2$ and $H_2$ with a slight excess of $CO_2$ to the CO-SER unit to produce a CO-SER product gas comprising CO, a small amount of $CO_2$, and substantially no $H_2$ at high pressure;
   (c) providing a TSA unit having a plurality of adsorber vessels, each adsorber vessel having an adsorbent therein capable of selectively adsorbing $CO_2$ said adsorber vessel being at high pressure and low temperature;
   (d) feeding the CO-SER product gas to one of said plurality of adsorber vessels in the TSA unit to selectively remove $CO_2$ gas to produce a TSA product gas that is of high CO purity and of high pressure, said feeding continuing to said one adsorber vessel until a point prior to $CO_2$ breakthrough occurring, wherein said adsorbent therein is substantially spent and then going on to sequentially feed others of said plurality of adsorber vessels; and
   (e) regenerating any adsorber vessels having adsorbent that is substantially spent, providing fuel for a fired heater in the CO-SER, and providing $H_2$ for said feed gas of substantially equimolar mix of $CO_2$ and $H_2$ in a regeneration process comprising the steps of:
      (i) letting down the pressure in said adsorber vessels having substantially spent adsorbent therein to a pressure consistent with a fuel supply for the CO-SER unit;
      (ii) heating said adsorbent in said adsorber vessels having substantially spent adsorbent therein by passing $H_2$ at high temperature through the adsorber vessel to eliminate a substantial portion of CO in the adsorber vessel and producing a first TSA regeneration effluent gas containing $H_2$, a small amount of $CO_2$ and small amount of CO;
      (iii) providing said first TSA regeneration effluent gas for fuel for the CO-SER unit;
      (iv) pressurizing said adsorber vessels after the step of heating said adsorbent in said adsorber vessels having substantially spent adsorbent therein to a high pressure with $H_2$ at high temperature and high pressure;
      (v) continuing to heat said adsorber vessels after the step of pressurizing said adsorber vessels by passing $H_2$ at high temperature and high pressure to produce a second TSA regeneration effluent gas of $H_2$, $CO_2$ and low levels of CO that is of sufficient purity to be used as $H_2$ in the feed gas to a CO-SER process, said second TSA effluent gas provided at high pressure;
      (vi) combining the second TSA effluent gas with a feed of $CO_2$ to obtain the feed gas of substantially equimolar mix of $CO_2$ and $H_2$ with a slight excess of $CO_2$;
      (vii) cooling said at least one adsorber vessel subsequent to said step of continuing to heat said spent adsorbent by passing virgin, substantially 100% pure $H_2$ at high pressure and ambient temperature through the adsorber and producing an effluent of $H_2$ gas at a temperature between high and low temperature and high pressure;
      (viii) adjusting, if necessary, the temperature of the effluent of $H_2$ gas obtained in the step of cooling said adsorber to high temperature; and
      (ix) providing the effluent of $H_2$ gas produced in the step of cooling said at least one adsorber vessel as the $H_2$ in the step of heating the adsorbent in said adsorber vessels having substantially spent adsorbent therein and producing the first TSA effluent gas and in the step of continuing to heat said spent adsorbent by passing $H_2$ at high temperature and high pressure to produce the second, more pure TSA regeneration effluent gas;
   wherein at least two of said steps of feeding the CO-SER product gas to one of said plurality of adsorber vessels and said regenerating steps of heating said adsorbent in at least one of said adsorber vessels, continuing to heat said spent adsorbent and cooling the adsorbent in the adsorber vessel may occur simultaneously, each step occurring in at least one of said plurality of adsorber vessels.

12. The process for producing high purity carbon monoxide product gas of claim 11, wherein the high purity carbon monoxide product gas is of at least 99.9% purity.

13. The process for producing high purity carbon monoxide product gas of claim 11, wherein high pressure means approximately 4 to 20 atmospheres.

14. The process for producing high purity carbon monoxide product gas of claim 11, wherein high temperature is defined as in the range of about 300 to 800 degrees Fahrenheit and preferably about 600 degrees Fahrenheit and low temperature is defined as being in the range of ambient to 150 degrees Fahrenheit.

15. The process for producing high purity carbon monoxide product gas of claim 11, wherein the step of providing the TSA unit having a plurality of adsorber vessels includes providing the TSA unit having three adsorber vessels, wherein the step of regenerating any adsorber vessels includes regenerating two of said three adsorber vessels, wherein one of said adsorber vessels being regenerated is used for the heating steps in the regenerating steps and one of said adsorber vessels being regenerated is used for the cooling steps in the regenerating steps.

16. The process for producing high purity carbon monoxide product gas of claim 11, wherein the steps of regenerating any adsorber vessels includes countercurrently or cocurrently rinsing voids of the adsorber to remove $H_2$ using the TSA product gas to produce an effluent gas consisting of $H_2$ and approximately 5 to 10% CO at high pressure and providing said effluent gas for fuel for the CO-SER unit, wherein said rinsing may occur simultaneously with said other steps in the process for producing high purity carbon monoxide product gas.

17. The process for producing high purity carbon monoxide product gas of claim 11, wherein the steps of regenerating any adsorber vessels includes cocurrently rinsing voids of the adsorber to remove $H_2$ using the CO-SER product gas to produce an effluent gas consisting of $H_2$ and approximately 5 to 10% CO at high pressure and providing said effluent gas for fuel for the CO-SER unit.

18. The process for producing high purity carbon monoxide product gas of claim 11, wherein the step of heating said adsorbent in said adsorber vessels having substantially spent adsorbent therein by passing $H_2$ at high temperature and high pressure through the adsorber vessel includes specifying the required amount of $H_2$ at high temperature as the amount needed to increase the temperature of the entire adsorption unit including adsorbent, support plates, vessel walls and insulation to the temperature of the $H_2$, at high temperature.

19. The process for producing high purity carbon monoxide product gas of claim 11, wherein the step of heating said adsorbent in said adsorber vessels having substantially spent adsorbent therein by passing $H_2$ at high temperature and high pressure through the adsorber vessel includes specifying the required amount of $H_2$ at high temperature as less than the amount needed to increase the temperature of an entire adsorption unit, including adsorbent, support plates, vessel walls and insulation and feeding the $H_2$ countercurrent to the direction of the CO-SER product feed, and wherein said step of cooling said adsorber is performed in the same counter-current direction.

* * * * *